United States Patent
Gillies

(10) Patent No.: US 9,562,807 B2
(45) Date of Patent: Feb. 7, 2017

(54) SYSTEM AND METHOD FOR MONITORING VIBRATION ISOLATORS

(71) Applicant: STMicroelectronics (Research & Development) Limited, Marlow Bucks (GB)

(72) Inventor: Stuart Gillies, Balerno (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 0 days.

(21) Appl. No.: 14/981,071

(22) Filed: Dec. 28, 2015

(65) Prior Publication Data

US 2016/0131519 A1    May 12, 2016

Related U.S. Application Data

(62) Division of application No. 13/613,139, filed on Sep. 13, 2012, now Pat. No. 9,238,393.

(30) Foreign Application Priority Data

Sep. 14, 2011 (GB) .................................. 1115908.4

(51) Int. Cl.
*G01M 17/04* (2006.01)
*G01H 9/00* (2006.01)
(Continued)

(52) U.S. Cl.
CPC .............. *G01H 9/00* (2013.01); *B60G 17/019* (2013.01); *B60G 99/002* (2013.01); *G01B 11/16* (2013.01);
(Continued)

(58) Field of Classification Search
CPC  G01M 5/0041; G01M 5/0091; G01M 11/081; G01M 17/04; B60G 17/019; B60G 2204/116; B60G 2204/1162
(Continued)

(56) References Cited

U.S. PATENT DOCUMENTS

| 4,158,853 A | 6/1979 | Sullivan et al. |
| 4,822,042 A | 4/1989 | Landsman |

(Continued)

FOREIGN PATENT DOCUMENTS

| CN | 202032994 | 11/2011 |
| DE | 10063694 | 7/2002 |

(Continued)

OTHER PUBLICATIONS

Aull et al., "Geiger-Mode Avalanche Photodiodes for Three-Dimensional Imaging," Lincoln Laboratory Journal, Nov. 2, 2002, pp. 335-350 See Priority U.S. Appl. No. 13/613,139, filed Sep. 13, 2012.

(Continued)

*Primary Examiner* — Laura Martin
*Assistant Examiner* — Rose M Miller
(74) *Attorney, Agent, or Firm* — Allen, Dyer, Doppelt, Milbrath & Gilchrist, P.A.

(57) ABSTRACT

A system may monitor a vibration isolating connection between a first part and a second part. The system may include a light source, an optical sensor mounted to receive light from the light source, and a processing unit for providing an output indicative of the deformation of the vibration isolating connection based on the output of the optical sensor.

24 Claims, 7 Drawing Sheets

(51) Int. Cl.
*G01M 11/08* (2006.01)
*B60G 17/019* (2006.01)
*B60G 99/00* (2010.01)
*G01B 11/16* (2006.01)

(52) U.S. Cl.
CPC ........... *G01M 11/081* (2013.01); *G01M 17/04* (2013.01); *B60G 2204/1162* (2013.01); *B60G 2400/91* (2013.01); *B60G 2400/94* (2013.01); *B60G 2401/14* (2013.01)

(58) Field of Classification Search
USPC ...................... 73/643, 117.03, 597, 655, 657
See application file for complete search history.

(56) References Cited

U.S. PATENT DOCUMENTS

| | | |
|---|---|---|
| 5,226,650 A | 7/1993 | Suttner |
| 5,767,382 A | 6/1998 | Buchanan |
| 6,042,483 A | 3/2000 | Katayama |
| 6,580,496 B2 | 6/2003 | Bamji et al. |
| 6,587,186 B2 | 7/2003 | Bamji et al. |
| 6,817,246 B1 | 11/2004 | Rottner et al. |
| 7,133,739 B2 | 11/2006 | Williamson et al. |
| 7,262,402 B2 | 8/2007 | Niclass et al. |
| 7,301,608 B1 | 11/2007 | Mendenhall et al. |
| 7,547,872 B2 | 6/2009 | Niclass et al. |
| 7,684,020 B1 | 3/2010 | Marti et al. |
| 8,355,117 B2 | 1/2013 | Niclass |
| 8,749,765 B2 | 6/2014 | Moore |
| 9,058,081 B2 | 6/2015 | Baxter |
| 2002/0007676 A1 | 1/2002 | Ward et al. |
| 2003/0205869 A1 | 11/2003 | Schutt |
| 2004/0032970 A1 | 2/2004 | Kiraly |
| 2004/0046741 A1 | 3/2004 | Low et al. |
| 2006/0008116 A1 | 1/2006 | Kiraly et al. |
| 2006/0086896 A1 | 4/2006 | Han |
| 2006/0189398 A1 | 8/2006 | Zanzucchi et al. |
| 2006/0192086 A1 | 8/2006 | Niclass et al. |
| 2006/0202694 A1 | 9/2006 | Maeda et al. |
| 2007/0051178 A1 | 3/2007 | Chien |
| 2007/0182949 A1 | 8/2007 | Niclass |
| 2007/0197314 A1 | 8/2007 | York et al. |
| 2007/0228358 A1 | 10/2007 | Ofek |
| 2008/0156993 A1 | 7/2008 | Weinberg et al. |
| 2008/0297487 A1 | 12/2008 | Hotelling et al. |
| 2009/0029793 A1 | 1/2009 | Cage |
| 2009/0039068 A1 | 2/2009 | Boutwell |
| 2010/0133636 A1 | 6/2010 | Richardson et al. |
| 2010/0156830 A1 | 6/2010 | Homma et al. |
| 2010/0295821 A1 | 11/2010 | Chang et al. |
| 2012/0132636 A1 | 5/2012 | Moore |
| 2012/0133617 A1 | 5/2012 | Dargan |
| 2012/0194479 A1 | 8/2012 | Stark et al. |

FOREIGN PATENT DOCUMENTS

| | | |
|---|---|---|
| DE | 10257955 | 7/2004 |
| EP | 1622093 | 2/2006 |
| EP | 1688746 | 8/2006 |
| EP | 2071433 | 6/2009 |
| EP | 2107445 | 10/2009 |
| EP | 2144303 | 1/2010 |
| EP | 2145656 | 1/2010 |
| EP | 2149755 | 2/2010 |
| ES | 2162733 | 1/2002 |
| GB | 2267584 | 12/1993 |
| GB | 2306825 | 5/1997 |
| GB | 2473449 | 3/2011 |
| GB | 2484077 | 4/2012 |
| GB | 2486164 | 6/2012 |
| JP | 11253319 | 9/1999 |
| WO | 03074137 | 9/2003 |
| WO | 2005094953 | 10/2005 |
| WO | 2008068607 | 6/2008 |
| WO | 2009124601 | 10/2009 |
| WO | 2010081652 | 7/2010 |

OTHER PUBLICATIONS

Albota et al, "Three-Dimensional Imaging Laser Radars with Geiger-Mode Avalanche Photodiode Arrays," Lincoln Laboratory Journal, Nov. 2, 2002, pp. 351-370 See Priority U.S. Appl. No. 13/613,139, filed Sep. 13, 2012.

Stark et al., "Object Detection System Using SPAD Proximity Detectors," Proc. of SPIE, vol. 8167, 2011, pp. 81672A-1 to 81672A-12 See Priority U.S. Appl. No. 13/613,139, filed Sep. 13, 2012.

SYSTEM AND METHOD FOR MONITORING VIBRATION ISOLATORS

FIELD OF THE INVENTION

The present application relates to a low cost apparatus for monitoring the performance of vibration isolators, and a related method.

BACKGROUND OF THE INVENTION

There are many applications for vibration isolators. For example, the suspension system of any vehicle comprises a number of vibration isolators. In particular, a suspension system commonly comprises at least one spring and at least one damper mounted in a suspension structure, which together allow significant movement of a wheel relative to the vehicle so as to isolate the car from vibrations caused by the wheel traveling over an uneven surface.

When a vehicle is moving over a surface, the surface can have irregularities, such as bumps or pot holes, which will cause a wheel of the vehicle to jolt up or down when following the surface. This sudden movement (which is also called a mechanical shock—or shock for short) will be passed directly onto the vehicle, which can cause a lot of discomfort for a person in the vehicle. Typically, a spring is used to absorb shocks by either compressing or extending. This allows the wheel to jolt, which in turn helps the wheel remain in contact with a surface, but also to prevent shocks from being transferred to the body of the vehicle. There are many different types of springs used on vehicles—coil springs, leaf springs, air springs, and torsion bars are some examples of springs used in typical suspension systems.

However, when a spring absorbs a shock it dissipates the energy of the shock through oscillation. On impact it will start to oscillate and continue to oscillate at its resonant frequency until the energy of the shock has been fully dissipated. This oscillation will be transferred to the body of the vehicle and will also reduce the grip a wheel exerts on a surface. In addition, this oscillation can also reduce the stability of the vehicle on the road. In order to control this oscillation, a damper (which is also called a shock absorber) is used. The damper's function is to absorb energy from the spring.

For most road vehicles, the shocks of greatest magnitude are received along a vector which can be predicted (the main shock vector). The spring and damper are mounted along the path of the main shock vector. The largest component of this vector is a vertical component (i.e. perpendicular to the surface of a road). However, not all shocks are received along the main shock vector. For example, when travelling over a bump in a road, the wheel of a vehicle may be pushed by a force comprising a vector perpendicular to the main shock vector. This can result in small shocks and vibrations that cause discomfort, noise, and wear of vehicle parts.

In order to absorb these additional shocks and vibrations, one or more vibration isolating connectors are used. In the context of the present disclosure, a vibration isolating connector is an element comprising one or more resilient materials which is used as an interface in the connection between two parts. Deformation of the vibration isolating connector allows a small amount of movement between the two parts. This in turns allows the vibration isolating connector to absorb small shocks and vibrations. Thus, vibration isolating connectors are particularly useful as part of the connection between elements of the shock absorber structure. A vibration isolating connector can also be used for the same purpose as part of an engine mount to minimize the amount of vibration, which is transferred from the engine of a vehicle to the chassis of the vehicle. In addition a vibration isolating connector can be used to mount the chassis of a vehicle onto the frame of a vehicle to minimize the amount of vibration, which is transferred from the frame of a vehicle to the chassis of the vehicle.

A common type of vibration isolating connector is a bushing. A bushing can be formed comprising any suitable resilient material. For example, rubber and polyurethane are both commonly used. In addition, a bushing can comprise a fluid. The fluid is preferably allowed to pass from one chamber to another via a channel. This type of bushing is known as a hydrobush.

Unfortunately, vibration isolating connectors degrade with use and over time. Degradation of vibration isolating connectors may reduce the performance of a suspension system and can potentially leave the vehicle dangerous to drive. At present, vibration isolating connectors are merely visually inspected to decide if they should be replaced. However, there are several problems with visual inspection.

For example, a skilled person, such as a mechanic must perform the visual test. As a result, the visual test can only be performed periodically and at a cost to the vehicle owner/user. There may be a risk that a vibration isolating connectors can fail between tests, resulting in the vehicle being used in a compromised state until the next test—which increases the wear on the suspension system as a whole and in turn reduces the life span of other components in the suspension system.

In addition, the visual test is performed on a static vehicle. As a result, any problems that only manifest when a vibration isolating connector is under load and the vehicle is moving will not be detected. Furthermore, the visual test may not pick up any internal damage to the vibration isolating connector and is likely to be overly concerned with superficial exterior damage. As a result, a vibration isolating connector with internal damage may be left in place, compromising the performance of the suspension system. Vibration isolating connectors will also be replaced unnecessarily because its surface looks to be in poor condition, even if the bushing has plenty of working life left.

Another drawback may be that a suspension system can comprise a large number of vibration isolating connectors and other parts, some of which may be difficult to visually inspect. Thus, when a driver notices a handling issue or excessive vibration within the chassis and takes the vehicle for inspection, it can be difficult to diagnose the exact problem or determine which vibration isolating connector is the source of the problem. As a result, there is an increased risk of the failure of vibration isolating connectors being misdiagnosed in a test.

SUMMARY OF THE INVENTION

According to one aspect of the present disclosure, a system for monitoring a vibration isolating connection between a first part and a second part is disclosed. The system may comprise a light source, an optical sensor mounted to receive light from the light source, and a processing unit for providing an output indicative of the deformation of the vibration isolating connection based on the output of the optical sensor.

For example, the optical sensor may comprise a single photon avalanche diode (SPAD), and the light source may comprise a laser diode. In some embodiments, the light source and the optical sensor may be mounted within a housing.

In certain embodiments, the vibration isolating connection may comprise a bushing. The light source and optical sensor nay be mounted on the first part. The light source may be mounted adjacent to the optical sensor. The light source and optical sensor may be mounted together in a single housing. Alternatively, the light source may be mounted on the first part, and the optical sensor may be mounted on the second part.

Additionally, the light source and the optical sensor may be mounted on the first part, and a light guiding means or a light guide may be mounted on the second part, wherein the light guide is for directing light from the light source to the optical sensor. For example, the light guide may comprise a mirror. The optical sensor and the light source may also be mounted within the vibration isolating connection.

In some embodiments, the system may comprise a plurality of optical sensors. The processing unit may be coupled to a first memory for storing the output indicative of the deformation of the vibration isolating connection. The processing unit may be coupled to a second memory, wherein the second memory stores information about the vibration isolating connection.

More specifically, the processing unit may compare information in the second memory with the output indicative of the deformation of the vibration isolating connection. The processing unit may be adapted to generate a warning signal when the output indicative of the deformation of the vibration isolating connection is outside of a predetermined range based on the information in the second memory.

In some embodiments, the second memory may be removable. The second memory may be adapted for communication with an external processor.

Another aspect is directed to a method for monitoring the performance of a vibration isolating connection. The method may comprise transmitting light from a light source along an optical path to an optical sensor, wherein the length of the path is varied by deformation of the vibration isolating connection, and determining from the received light the a value indicative of the length of the optical path.

The method may comprise determining the deformation of the vibration isolating connection based on a plurality of values indicative of the length of the optical path. The method may comprise a calibration step for providing a first set of readings for the vibration isolating connection.

Additionally, the first set of readings may comprise data regarding the composition of the vibration isolating connector and/or its expected tolerances. The method may comprise comparing the value indicative of the length of the optical path with the first set of readings. The method may comprise determining if the range of motion of the vibration isolating connector while in use is within calibrated normal values based on the comparison between the value indicative of the length of the optical path and the first set of readings.

The method may comprise generating a warning signal if it is determined that the range of motion of the vibration isolating connector while in use is within calibrated normal values lies outside calibrated normal values. The method may comprise recording information based on the value indicative of the length of the optical path. For example, the transmitting of light may be preformed at intervals of 5-100 Hz.

Another aspect is directed to a vehicle comprising the system described above. Another aspect is directed to a storage device adapted to cause a computer system to execute the method described above.

BRIEF DESCRIPTION OF THE DRAWINGS

Aspects of the present disclosure will now be described by way of example only and with reference to and as shown in the accompanying drawings, wherein.

DETAILED DESCRIPTION OF THE PREFERRED EMBODIMENTS

Figure 1:
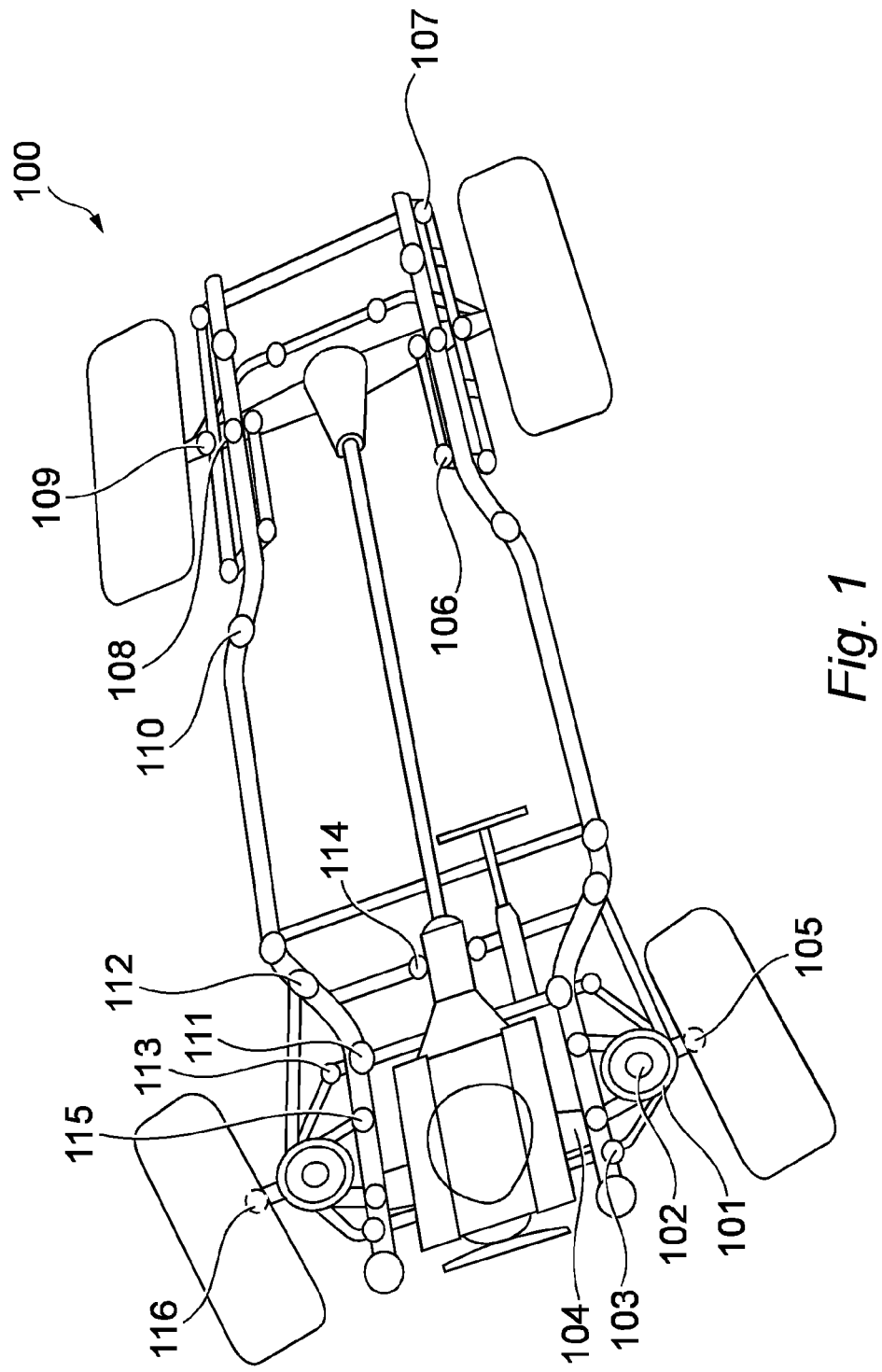
FIG. 1 shows an example embodiment of a suspension system showing a number of possible locations of vibration isolating connectors, according to the present invention.

FIG. 1 shows an exemplary suspension system 100. As is apparent from FIG. 1, a suspension system can comprise a large number of vibration isolating connectors. For example, the suspension system 100 may comprises shock and strut bushings 101, coil spring isolators 102, sway bar bushings 103, engine mounts/inserts 104, sway bar end link bushings 105, control/trailing arm bushings 106, leaf spring bushings 107, bump stops 108, shock and steering stabilizers 109, chassis mounts 110, rack and pinion bushings 111, radius/strut arm bushings 112, tie rid boots 113, transmission mounts 114, control arm bushings 115, and ball joint boots 116. Of course, other arrangements of vibration isolating connectors are possible.

FIG. 1 shows a typical chassis to which bodywork would be attached. Alternatively, vehicles may employ subframes in the region of each axle. The subframes may be either directly bolted to the body, or via additional bushings to allow some movement between subframe and chassis. Subframe-body bushings may be well hidden and difficult to observe by typical methods, so are particularly suited to being monitored using the present embodiments. In the present disclosure, an optical sensor and a light source are used to monitor the performance of a vibration isolating connector.

An SPAD is particularly well suited for this application. An SPAD is based on a p-n junction device biased beyond its breakdown region. The high reverse bias voltage generates a sufficient magnitude of electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by way of a single incident photon striking the high field region. It is this feature which gives rise to the name "single photon avalanche diode." This single photon detection mode of operation is often referred to as "Geiger Mode."

The idea that an SPAD can be used as in a ranging application is borne out by the application of a phase shift extraction method for range determination, although alternative methods exist for range determination using SPADs based on direct time of flight measurement. The term ranging in this application is intended to cover all ranging devices and methods including by not limited to ranging devices, proximity devices accelerometers, etc. Ranging can occur in a number of applications, including proximity detection which is relatively easy to implement and inexpensive. Laser ranging is more complex and costly than a proximity detector. Three-dimensional imaging is a high-end application that could be used to recognize gestures and facial expressions.

A proximity sensor is the most basic of the ranging applications. At its simplest, the sensor is capable of indicating the presence or absence of a user or object. Additional, computation and illuminator complexity can provide enhanced data such as the range to an object. A typical range is of the order 0.01 m to 0.5 m. In a simple proximity sensor, the illumination source could be a modulated LED, at a wavelength of about 850 nm.

The next application group is that of laser ranging, where the illumination source is a modulated diode laser. Performance can range from <1 cm to 20 m range (and higher for top end systems) with millimeter accuracy. Requirements on optics are enhanced, with hemispherical lenses and narrow band pass filters being required. A near-field return may results in the introduction of parallax error, i.e. movement of the returned laser spot over the sensor pixel array dependent on distance to object. To overcome these problems the ranger includes calibration functions to enable the subtraction of the electronic and optical delay through the host system. Laser ranging is particularly advantageous when monitoring a vibration isolating connector because they do not deform significantly. As a result, unless a sensor is able to detect movement within the range of 2 mm-25 mm, it not be able to pick up the deformation of a vibration isolating connector accurately.

The third application group is that of 3D cameras. In this application a pixel array is used in order to avoid mechanical scanning of the array. Systems can be based on a number of different architectures. Both time of flight (TOF) and modulated illuminator based architectures are used, however, the latter is more robust to ambient light and thus fits best with established photodiode construction. Additional features, such as face and gesture recognition, are applications of this type of ranging device.

Most optical ranging implementations use either stereoscopic, structured light, direct TOF or phase extraction methods in order to ascertain the range to a target. Stereoscopic solutions use two typical cameras, and can have a heavy computation overhead in order to extract range. The structured light scheme uses diffractive optics and the range is computed using a typical camera based on how a known projected shape or matrix of spots is deformed as it strikes the target. The direct TOF method uses a narrow pulsed laser, with a time-digital converter (TDC) measuring the difference in time between transmission and first photon reception. Commonly, a "reverse mode" is employed, where the TDC measures the back-portion of time, i.e. the time from first photon reception to next pulse transmission. This scheme minimizes system activity to only the occasions where a photon is detected, and is therefore well matched to tightly controlled, low photon flux levels and medical applications such as fluorescent lifetime microscopy (FLIM).

The phase extraction method is probably the most commonly used method as it is well suited to systems which implement computation of the generalized range equation using existing photodiode technology. It is also robust to background ambient light conditions, and may be adapted to allow for varying illuminator modulation wave-shapes (i.e. sinusoidal or square). This scheme is favored for SPADs in proximity detection applications. The present embodiments take advantage of the fact that the phase extraction method system incorporates an inherent ambient light level detection function, which can be used in conjunction with an SPAD for many applications.

It is important to understand the range equation derivation as it indicates the ease of applicability of SPADs to phase extraction proximity detection and ranging solutions. It also aids in the understanding of inherent features such as ambient light metering and measuring a depth of interest for a specific purpose.

Distance is determined from the speed of light and TOF, as follows:

$$s = ct;$$

where s is distance, c the speed of light, and t is time. For a ranging system however, the distance is doubled due to the fact there are send and receive paths. As such, the distance measured in a ranging system s is given by:

$$s = \tfrac{1}{2} ct.$$

The time shift component (="t") due to the photon TOF is dependent on the modulation frequency and phase shift magnitude of the waveform. t=% shift of the returned waveform $x t_{mod\_period}$ and if $t_{mod\_period}/f_{mod}$:

$$\Rightarrow t = \frac{\phi}{2\pi} \circ \frac{1}{f}$$

$$\Rightarrow t = \frac{\phi}{2\pi \circ f}.$$

The units are in radians. Then, by substituting the above equation back into the starting equation: the "range equation" is expressed as:

$$\Rightarrow s = \frac{c \circ \phi}{4\pi \circ f}.$$

The critical component in this equation is φ, which is the unknown component of the % shift of the returned waveform. The following section discusses how this can be determined.

Since the values of c, f and π are all constants; the range result simply scales with (I), (the % shift of the received light waveform in relation to that which was transmitted). FIG. 1 demonstrates how φ may be determined for a system employing a square wave modulated illuminator. The transmitted and received waveforms are shifted from one another by φ. By measuring the photons that arrive in "a" and "b," in bins 1 and 2 respectively, the value of φ can be determined as follows:

$$\frac{\phi}{2\pi} = \frac{b_{count}}{(a+b)_{count}}.$$

In this type of system, there is a range limit set by the illuminator modulation frequency, which is known as the unambiguous range. Photons received from targets that are further away than this range can introduce an aliasing error by erroneously appearing in a legitimate bin for a subsequent measurement. Since determination of range is enabled by the modulation process, it is desirable to maximize the number of edges of the modulation waveform in order to accumulate data for averaging purposes as fast as possible. However, a high modulation frequency may lower the unambiguous range and introduces more technical complexity in the illuminator driver circuitry. Therefore, two or more different modulation frequencies may be interleaved or used intermittently, so as to reduce or negate the impact of aliased photons via appropriate data processing.

Figure 2A:
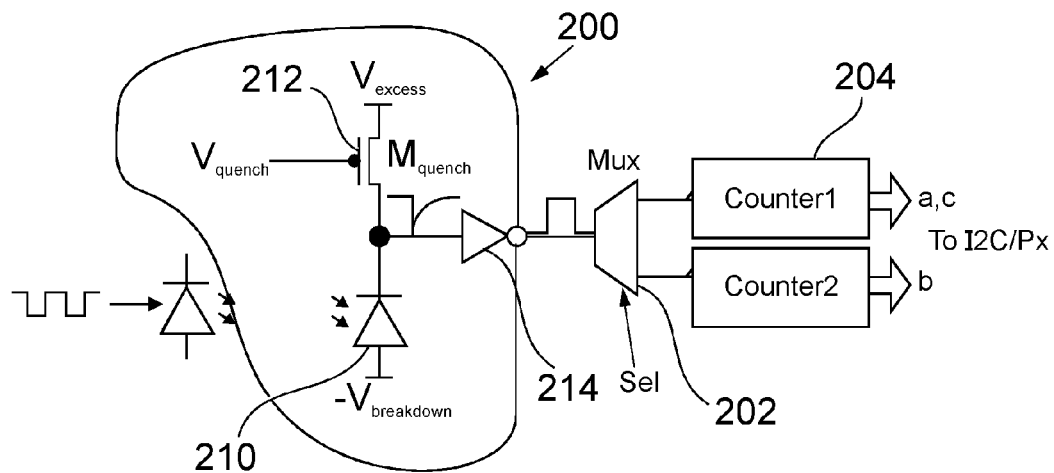
FIGS. 2a-2b illustrate an embodiment of an SPAD based proximity sensor and an associated waveform diagram, according to the present invention.
Figure 2B:
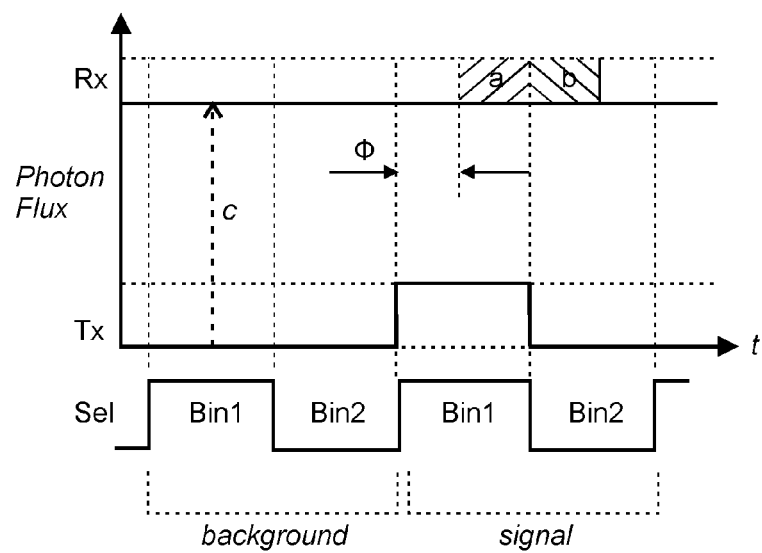

FIG. 2A illustrates a possible implementation of an SPAD based proximity sensor with an associated waveform diagram. FIG. 2A shows an SPAD 200 connected to a multiplexer 202. The output from the multiplexer passes through counters 1 and 2 (204). The SPAD device, shown generally at 200, is of a typical type, including a photo diode 210, a p-type MOSFET 212, and a NOT gate 214.

The timing waveforms are shown in such a way so as to represent the relative photon arrival magnitudes. It can be seen that an extra phase has been added to enable computation of the background ambient light level offset "c," although this can be significantly reduced by the use of a narrow optical band-pass filter matched to the illuminator wavelength if necessary. The element "c" is then accommodated in the computation of received light phase shift φ. The computed results for a, b, c are determined and written into either a temporary memory store or an I2C register. The computation of the phase shift φ, is calculated as follows:

$$\phi = \frac{a_{count} - c}{(a+b)_{count} - 2c}.$$

The predetermined selection of modulation frequency is performed by dedicated logic or host system, which selects a suitable frequency or frequencies for the application of the range sensor. The range sensor of FIG. 2A is dependent on the amount of light that can be transmitted on to the scene, system power consumption and the target reflectivity.

Since the system shown in FIG. 2A needs to compute the background light condition in order to ascertain the offset of the returned light pulse from the target, ambient light metering is included. A simplified timing scheme is employed if only the ambient light level data is required, since the target illumination cycle is not necessary. If a narrow band IR filter is employed in the optical path, the value of c will represent only the content of the filter pass band. This can then be extrapolated to an approximation of the general ambient light conditions.

Figure 3:
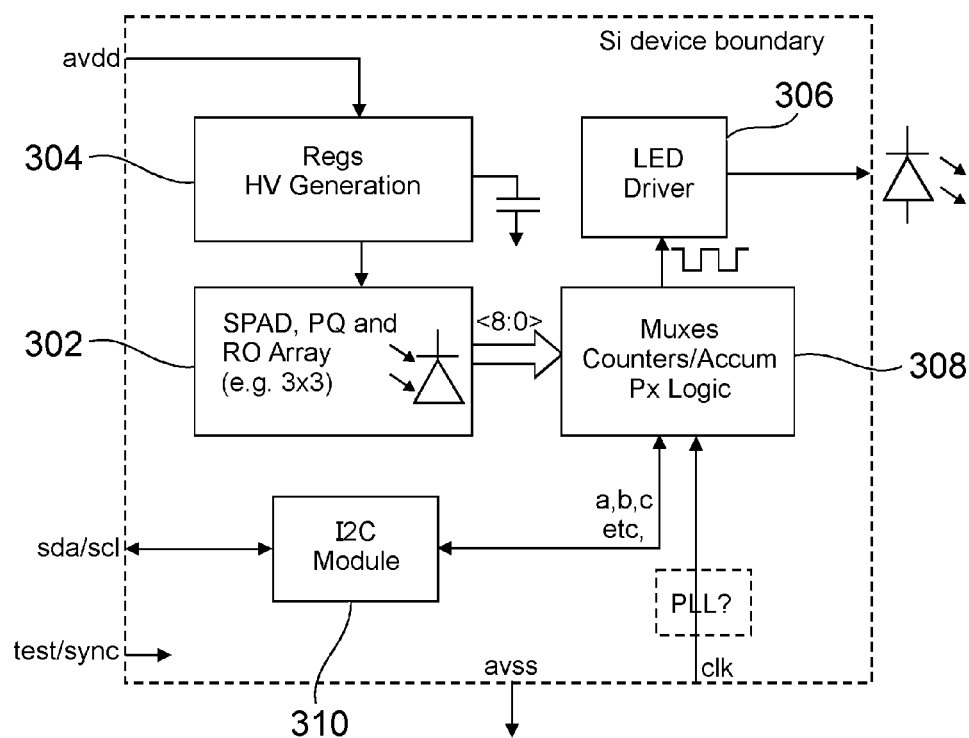
FIG. 3 shows a block diagram of a proximity sensor, according to the present invention.

Referring to FIG. 3, a block diagram of a proximity sensor is shown. The proximity sensor 300 includes SPAD function and the quenching thereof in block 302. The quenching can be passive as shown or of any other suitable type. The bias voltage for the SPAD may be provided by a charge pump or any other suitable device 304. The sensor module also includes an LED or other illumination source and an associated driver 306 to ensure that the required modulation is applied to the illumination source.

The sensor may include a distance computation logic module to determine range. Alternatively this can be located in a host device in which the range sensor is used. The sensor also includes multiplexers and counters 308 and a storage means or a memory 310, such as an I2C module. The sensor may also include a Phase Locked Loop (PLL) for clocking and subsequent timed signal generation purposes.

The power consumption of SPADs and their readout circuits is dependent on the incident photon arrival rate. The average power consumption of a ranging system could be reduced by using power saving modes such as pulsed on/off operation, at a rate of ~10 Hz, for example, at the expense of target motion distortion.

The sensor may be implemented on a 1 mm² die size, and the I2C module could also be implemented on an appropriate die. The sensor may include an optical package, an integral IR band pass filter (either coating or inherent in the optical elements) and an optimal field of view of about 30°. As the sensor is not intended to "create an image" but is instead used to ensure that as many photons as possible are detected the optics could be made from injection molded hemispherical elements. The illuminator source should ideally be of a non-visible wavelength, for example, in the near infra red (NIR) band, such as 850 nm.

The proximity sensor has been described with reference to simple low cost system, although it will be appreciated for certain applications, the laser ranging and 3D camera technologies discussed above, could be used. As previously indicated, the proximity sensor of the present embodiments is versatile and can be used in a vast array of different applications.

The measurement of photons that arrive in "a" and "b," in bins 1 and 2 respectively, and hence the value of φ is determined by a data extraction algorithm, which is performed on the output of the optical module 12. Thus, the detection of an object in proximity to the optical key generates a keystroke signal in a similar manner to a pressing a key of a typical keyboard.

Figure 4:
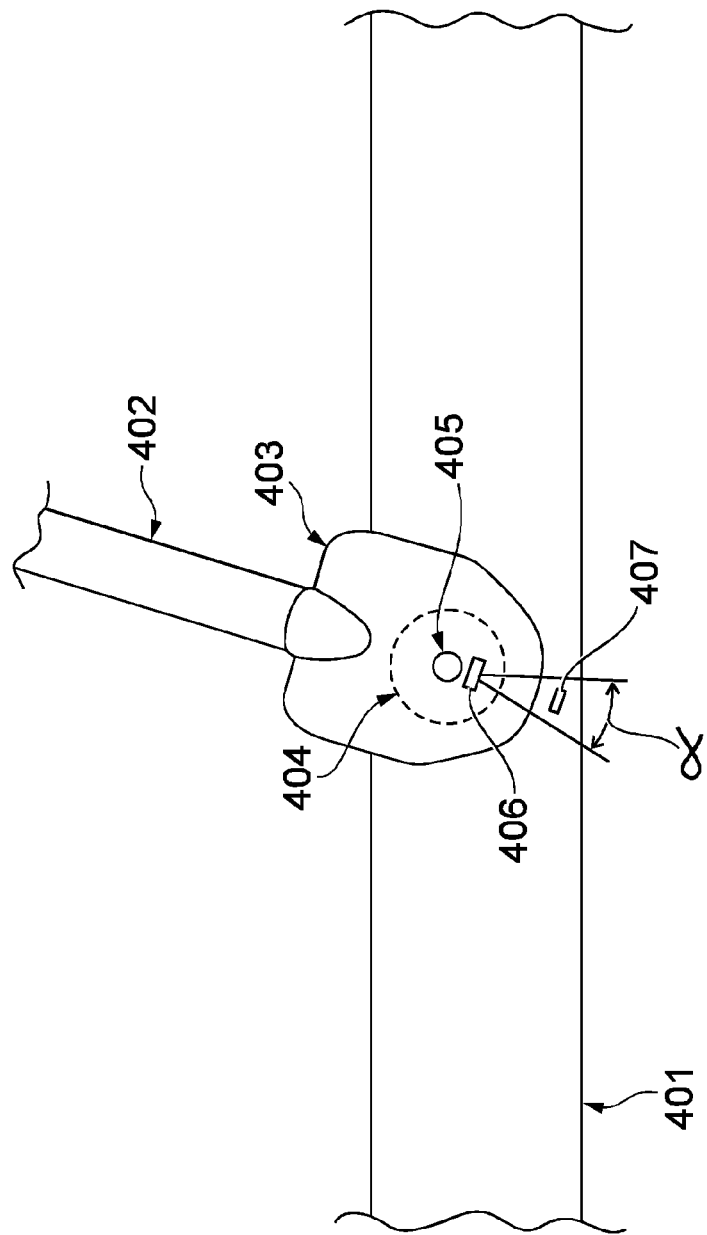
FIG. 4 shows an optical device mounted to measure the performance of a bushing, according to the present invention.

FIG. 4 shows a shock and strut bushing in more detail. The bracket 403 is connected to a McPherson strut and is for mounting the strut to the arm 401. The arm 401 has an opening for receiving a cylindrical bushing 404. The bracket 403 is bolted or pinned to the arm 401 such that the stem 405 of the bolt or pin runs through the bushing 404. As a result, sudden shocks are transferred in a chain from the arm 401, to the bushing 404, to the stem 405, and to the bracket 403. The bushing 404 acts as vibration isolating connector. The bushing 404 deforms under shock allowing a small amount of movement in the range of 1 mm to 15 mm in the position of the stem 405 relative to the arm 401. As a result, the bracket's 403 position relative to the arm 401 will also change under shock.

An optical sensor 407 is mounted on the arm 401 and a light source 406 is mounted on the bracket 403 to form a light source/optical sensor pairing. In advantageous embodiments, the optical sensor 407 is an SPAD as discussed above, and/or the light source 406 is a laser diode.

Other arrangements of the light source/optical sensor pairing are possible. For example, the positions of the optical sensor 407 and the light source 406 can be swapped, or the light source/optical sensor pairing can be positioned at a different point around the periphery of the bracket 405. So long as light source/optical sensor pairing is set up such that: the optical sensor 407 detects light from the optical source 406; and the optical sensor 407 is located on a part which moves relative to the optical source 406 due to deformation of the bushing 404, movement due to deformation of the bushing 404 can be detected. As the arm 401 moves up and down, the bracket 403 will also rotate relative to the arm 401. So long as the magnitude of the angle of rotation is smaller than the angle α of the light beam having its apex at the light source 406, this will not present a problem.

It will also be apparent that other vibration isolating connectors can be monitored in the same way, i.e. so long as a light source/optical sensor pairing is set up such that: the optical sensor detects light from the optical source; and the optical sensor is located on a first part which moves relative to a second part to which the optical source is mounted. The relative movement is due to deformation of the vibration isolating connector—the performance of the vibration isolating connector can be determined.

Mirrors and lenses can also be employed. For example, a washer having outer cylindrical surface which is mirrored can be located on the stem 405. It can be located between the bracket 403 and the nut or fixing which holds the bolt/pin in place (not shown) or alternatively between the arm 401 and the bracket 403. In this case, the light source and optical sensor can be located beside each other on the arm 401. Light from the light source is directed towards the washer so that it is reflected back to the light sensor. As the mirrored washer will move relative to the arm due to deformation of the bushing 404, this movement can be detected. In this case, rotation of the bracket 403 relative to the arm 401 will not cause a problem because rotation of the mirrored washer will not alter its reflexive characteristics due to its cylindrical shape, i.e. it will reflect in the same way whether it rotates or not.

For all the different arrangements of the present embodiments, mirrors and lenses can be further employed to change the optical path of the light from the light source to the optical sensor, so that the optical path need not follow a straight line. Preferably, the light source/optical sensor pairing are housed in a single package, which shines light towards the part to be monitored and detects light reflected back from a reflecting surface on the part. In addition, it is also possible to mount a light source/optical sensor pairing within a vibration isolating connector itself.

For all the different arrangements of the present disclosure, two or more light source/optical sensor pairings, each pairing having its own location separate from the other pairings, can be used. This allows the system to generate 2-dimensional positional data using trigonometry for the movement due to deformation of the bushing 404. The use of a plurality of light source/optical sensor pairings can also improve the accuracy of the system.

Figure 5A:
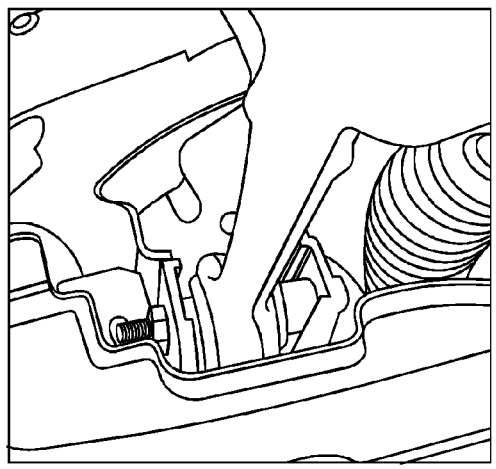
FIGS. 5a, 5b, and 5c show images of a number of mounting positions which can be monitored using the system, according to the present invention.
Figure 5B:
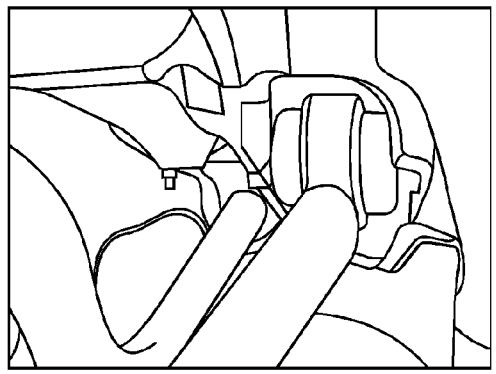
Figure 5C:
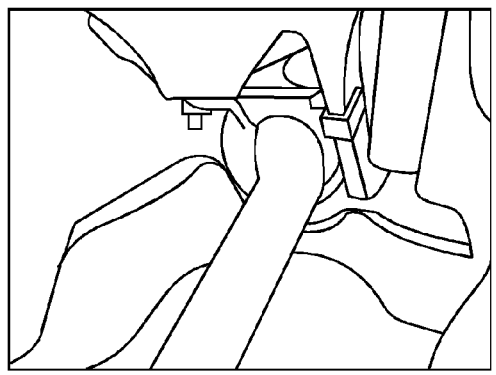

For all the different arrangements of the present disclosure, the wheel arch and the vehicle chassis of a vehicle should protect a light source/optical sensor pairing from getting covered by ambient dirt or mud from the surface upon which the vehicle is travelling. FIGS. 5a, 5b, and 5c show images of a number of mounting position which can be monitored using the present system. These images were taken from a car; FIG. 5a illustrates an example site for monitoring the deformation of a front control arm inner bush. FIG. 5b illustrates an example site for monitoring the deformation of a front wishbone inner bush, and FIG. 5c illustrates an example site for monitoring the deformation of a front anti-roll bar mount.

This car is over 5 years old and was used through Scottish winters including trips to ski areas. Surprisingly, there is a lack of dirt buildup in the areas proposed for measurement. Thus, a light source/optical sensor pairing can be mounted without protection from the ingress of dirt, thereby lowering the cost of the system.

However, the light source/optical sensor pairing can alternatively be contained within a housing if required to ensure that no dirt can ingress and interfere with the transmission and reception of light. In order to accommodate the movement of a vibration isolating connector, the housing can be formed of a resilient material. Alternatively, the housing can comprise two slidably engaged members, which can move relative to each other in use. Alternatively, the housings can comprise a flexible bellows structure.

Figure 6C:
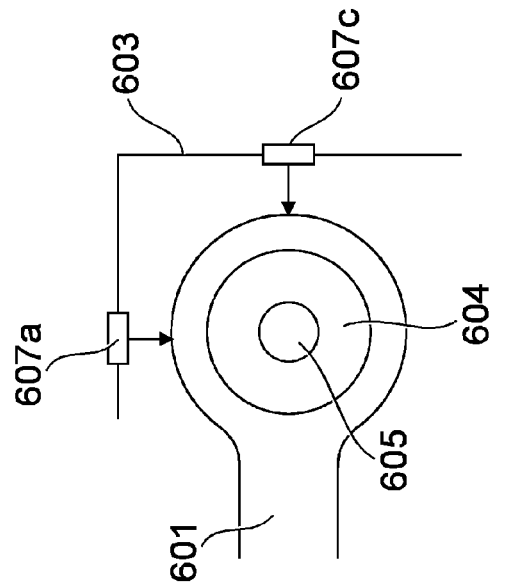
FIG. 6c shows another embodiment of optical devices, according to the present invention.
Figure 6B:
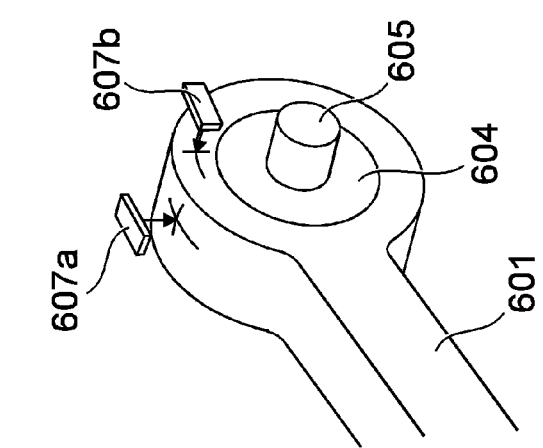
FIGS. 6a and 6b shows an alternative mounting arrangement of optical devices to measure the performance of a bushing, according to the present invention.
Figure 6A:
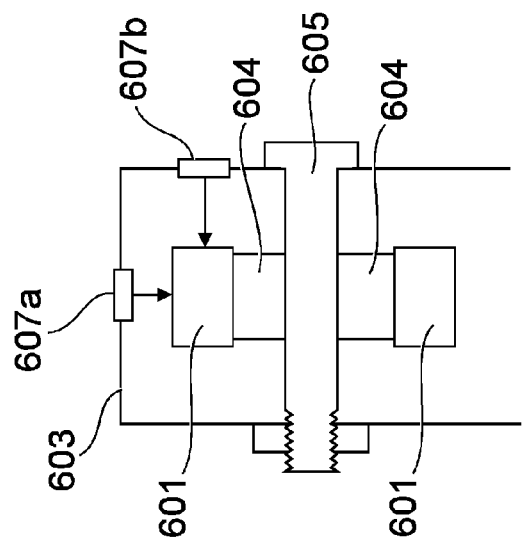

FIGS. 6a and 6b show an alternative arrangement for mounting light source/optical sensor pairings. In this arrangement, packages 607a and 607b are provided on a subframe 603 (which is not shown in FIG. 6b for clarity). Each package comprises a light source and an optical sensor. The light source shines light towards arm 601, and the optical sensor detects light reflected back from a reflecting surface on the arm 601. The reflecting surface must be suitably shaped such that it remains at an approximately constant distance from the measuring device under controlled suspension and steering movement. Measurements are made of the uncontrolled movement allowed by the bushing material to absorb shocks. Package 607a is positioned for measuring deformation of a bushing 604 along a first axis substantially at right angles to stem 605. Package 607b is positioned for measuring deformation of the bushing 604 along a second axis substantially parallel to stem 605. In this way, a two dimensional picture of the deformation of the bushing 604 can be obtained.

FIG. 6c shows a further arrangement for mounting light source/optical sensor pairings. In this arrangement, packages 607a and 607c are provided on a subframe 603. Again, each package comprises a light source and an optical sensor. The light source shines light towards arm 601, and the optical sensor detects light reflected back from the arm 601. Package 607a is positioned for measuring deformation of a bushing 604 along a first axis substantially at right angles to stem 605. Package 607b is positioned for measuring deformation of the bushing 604 along a third axis which is substantially at right angles to both the first axis and the stem 605.

It should be noted that any number of light source/optical sensor pairings could be used. In addition, any combination of the above embodiments could also be used. In particular, three packages, such as 607a, 607b, and 607c, could be provided so that: a first package 607a is positioned for measuring deformation of a bushing along a first axis substantially at right angles to a stem; a second package 607b is positioned for measuring deformation of the bushing along a second axis substantially parallel to the stem; and a third package 607c is positioned for measuring deformation of the bushing along a third axis, which is substantially at right angles to both the first axis and the second axis, thereby allowing the deformation of the bushing to be monitored in three dimensions.

As noted above in relation to FIG. 1, subframe-body bushings may be well hidden and difficult to observe by traditional means, so are particularly suited to being monitored using the present system. In this case, at least one light source/optical sensor pairing is preferably mounted as a package on either the subframe or the vehicle body to monitor the relative distance between the subframe and the vehicle body, which is due to deformation of the subframe-body bushing(s). Of course, more than one light source/ optical sensor pairing can be used in a manner similar to that described in relation to FIGS. 6a, 6b, and 6c.

Figure 7:
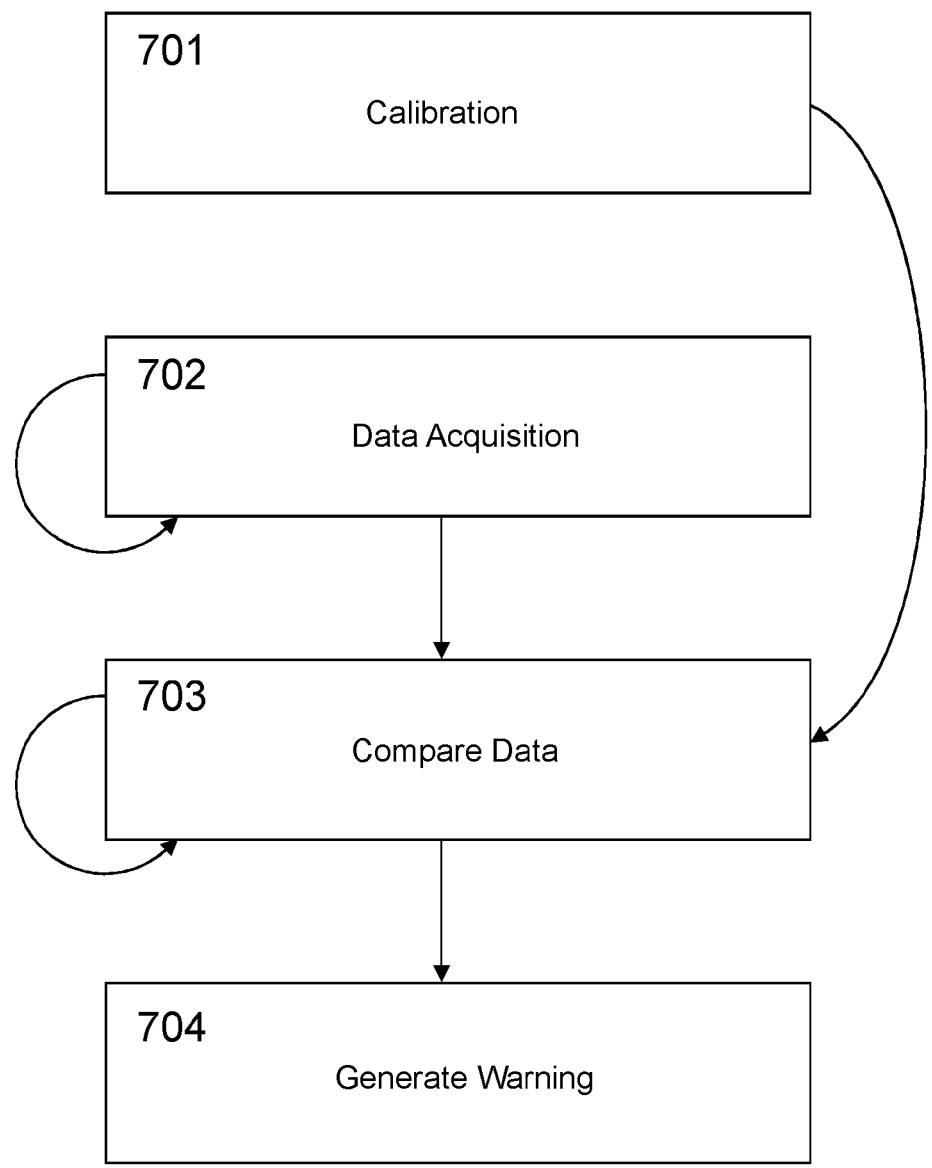
FIG. 7 shows a flowchart for the method of monitoring the performance of a vibration isolating connector, according to the present invention.

FIG. 7 shows a flow chart for the method of monitoring the performance of a vibration isolating connector. In step 701, the system is calibrated. Data indicative of the readings of one or more light source/optical sensor pairings for a new vibration isolating connector is provided to a memory located in the vehicle to which the vibration isolating connector is mounted. In addition, data regarding the composition of the vibration isolating connector and/or its expected tolerances can also be provided to the memory.

In step 702, when the vehicle is in use, the readings of the one or more light source/optical sensor pairings are recorded continually or at regular predetermined intervals. The readings can then be provided to a controller. Preferably, the rate of measurement is in the range of 5-100 Hz. An optimum sample rate may also be calibrated by sampling at the highest frequency possible to record the shortest duration of displacement during test conditions.

In step 703, the readings provided in step 702 are compared continually or at regular predetermined intervals against the stored calibration data to determine if the range of motion of the vibration isolating connector while the vehicle is in use is within calibrated normal values. Based on this determination, a decision is made as to whether any of the readings provided in step 702 exceeds a satisfactory working range.

If an out-of-range reading is received, then a warning signal is generated in step 704. This signal can be provided to a display or light on the dashboard of the vehicle so that it is raised on the dashboard. Alternatively, the signal can be used to generate a warning sound in the cabin of the car. A record of out-of-range data can be stored for subsequent upload and diagnosis at an appropriate vehicle service center. Steps 702, 703, and 704 can be executed by one or more processors coupled to memory.

It will be appreciated that the aspects of the suspension system and method discussed herein can be used in a large number of applications where vibration isolating connectors are used to dampen vibrations. For example, the present disclosure may have applied to engine suspension systems which employ bushings as part of the mounting between an engine and a vehicle chassis.

That which is claimed is:

1. A method for monitoring a vibration isolating connection, the method comprising:
    transmitting light from a light source along an optical path to be received by a single photon avalanche diode (SPAD) optical sensor, a length of the optical path being varied by deformation of the vibration isolating connection;
    operating the light source to interleave a plurality of different modulation frequencies; and
    determining from received light a value indicative of the length of the optical path.

2. The method of claim 1 further comprising determining the deformation of the vibration isolating connection based upon a plurality of values indicative of the length of the optical path.

3. The method of claim 1 further comprising performing a calibration to provide a first set of readings for the vibration isolating connection.

4. The method of claim 3 wherein the first set of readings comprises data for a composition of the vibration isolating connection and tolerances of the vibration isolating connection.

5. The method of claim 3 further comprising comparing the value indicative of the length of the optical path with the first set of readings.

6. The method of claim 5 further comprising determining if a range of motion of the vibration isolating connection while in use is within a range based upon the comparing between the value indicative of the length of the optical path and the first set of readings.

7. The method of claim 6 further comprising generating a warning signal if the range of motion of the vibration isolating connection while in use exceeds a threshold.

8. The method of claim 1 further comprising recording information based upon the value indicative of the length of the optical path.

9. The method of claim 1 wherein the vibration isolating connection comprises a bushing.

10. The method of claim 1 wherein transmitting of the light is performed at intervals of 5-100 Hz.

11. A method for monitoring a bushing, the method comprising:
    transmitting light from a laser source along an optical path to be received by a single photon avalanche diode (SPAD) optical sensor, a length of the optical path being varied by deformation of the bushing;
    operating the laser source to interleave a plurality of different modulation frequencies; and
    determining from received light a value indicative of the length of the optical path.

12. The method of claim 11 further comprising determining the deformation of the bushing based upon a plurality of values indicative of the length of the optical path.

13. The method of claim 11 further comprising performing a calibration to provide a first set of readings for the bushing.

14. The method of claim 13 wherein the first set of readings comprises data for a composition of the bushing and tolerances of the bushing.

15. The method of claim 13 further comprising comparing the value indicative of the length of the optical path with the first set of readings.

16. The method of claim 15 further comprising determining if a range of motion of the bushing while in use is within a range based upon the comparing between the value indicative of the length of the optical path and the first set of readings.

17. The method of claim 16 further comprising generating a warning signal if the range of motion of the bushing while in use exceeds a threshold.

18. The method of claim 11 further comprising recording information based upon the value indicative of the length of the optical path.

19. The method of claim 11 wherein transmitting of the light is performed at intervals of 5-100 Hz.

20. A non-transitory computer readable medium for causing a computer system to execute a method comprising:
    transmitting light from a light source along an optical path to be received by a single photon avalanche diode (SPAD) optical sensor, a length of the optical path being varied by deformation of a vibration isolating connection;
    operating the light source to interleave a plurality of different modulation frequencies; and
    determining from received light a value indicative of the length of the optical path.

21. The non-transitory computer readable medium of claim 20 wherein the computer system executes the method further comprising determining the deformation of the vibration isolating connection based upon a plurality of values indicative of the length of the optical path.

22. The non-transitory computer readable medium of claim 20 wherein the computer system executes the method further comprising performing a calibration to provide a first set of readings for the vibration isolating connection.

23. The non-transitory computer readable medium of claim 22 wherein the first set of readings comprises data for a composition of the vibration isolating connection and tolerances of the vibration isolating connection.

24. The non-transitory computer readable medium of claim 20 wherein the computer system executes the method further comprising transmitting of the light at intervals of 5-100 Hz.

* * * * *